United States Patent [19]
Naito et al.

[11] Patent Number: 5,104,204
[45] Date of Patent: Apr. 14, 1992

[54] ANTISKID BRAKE CONTROL SYSTEM

[75] Inventors: Yasuo Naito; Akihiko Mori; Ziroh Iihoshi, all of Himeji, Japan

[73] Assignee: Mitsubishi Denki K.K., Tokyo, Japan

[21] Appl. No.: 523,789

[22] Filed: May 16, 1990

[30] Foreign Application Priority Data

May 24, 1989 [JP] Japan .................. 1-131816

[51] Int. Cl.$^5$ .............................................. B60T 8/70
[52] U.S. Cl. ......................................... 303/107; 303/102; 303/110
[58] Field of Search ............. 303/113, 115, 119, 110, 303/92, 105, 91, 93, 97, 107, 109, 102; 364/426.1, 426.2

[56] References Cited

U.S. PATENT DOCUMENTS

| | | | |
|---|---|---|---|
| 3,697,139 | 10/1972 | Elliot et al. | 303/91 |
| 3,912,340 | 10/1975 | Bertolasi | 303/97 |
| 3,930,688 | 1/1976 | Rau et al. | 303/92 |
| 4,054,328 | 10/1977 | Leiber et al. | 303/103 |
| 4,073,546 | 2/1978 | Bayliss | 303/115 |
| 4,078,845 | 3/1978 | Amberg et al. | 303/107 |
| 4,180,223 | 12/1979 | Amberg | 303/107 X |
| 4,230,376 | 10/1980 | Brearley et al. | 303/105 X |
| 4,414,630 | 11/1983 | Harris et al. | 303/97 |
| 4,729,608 | 3/1988 | Fennel et al. | 303/109 |
| 4,736,994 | 4/1988 | Fennel et al. | 303/111 |

FOREIGN PATENT DOCUMENTS 61-21859  5/1986  Japan .
61-28541  7/1986  Japan .

Primary Examiner—Matthew C. Graham
Attorney, Agent, or Firm—Sughrue, Mion, Zinn, Macpeak & Seas

[57] ABSTRACT

An anti-skid brake control system capable of determining an amount of brake pressure that should be applied to a wheel of a vehicle based upon the condition of the road surface. The relationship between the amount of brake pressure applied in a current cycle and the condition of the road surface is extrapolated depending upon the duration of the non-slip period, and the brake pressure for the next cycle is modified accordingly. As a result, the brake pressure is optimized to be suitable for the current road conditions, and prevents wheel locking.

2 Claims, 6 Drawing Sheets

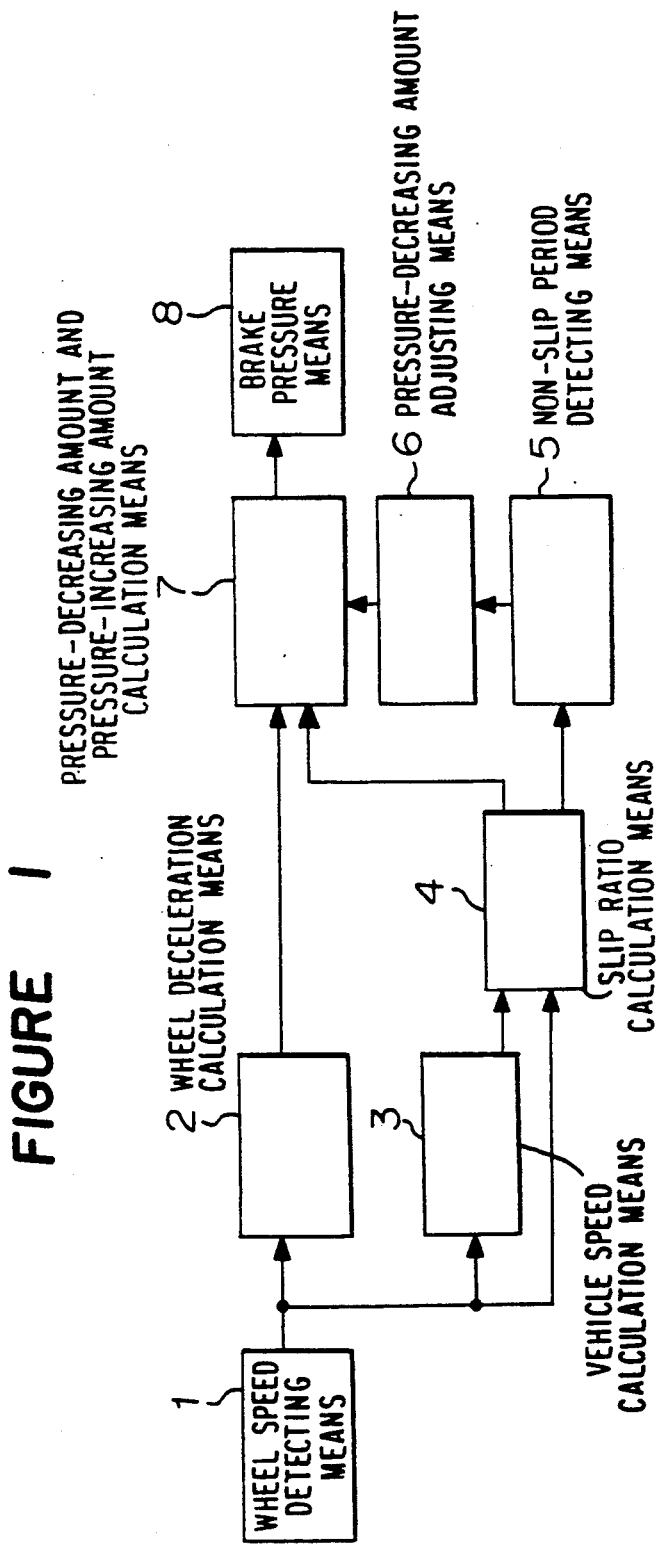

FIGURE 4(a)
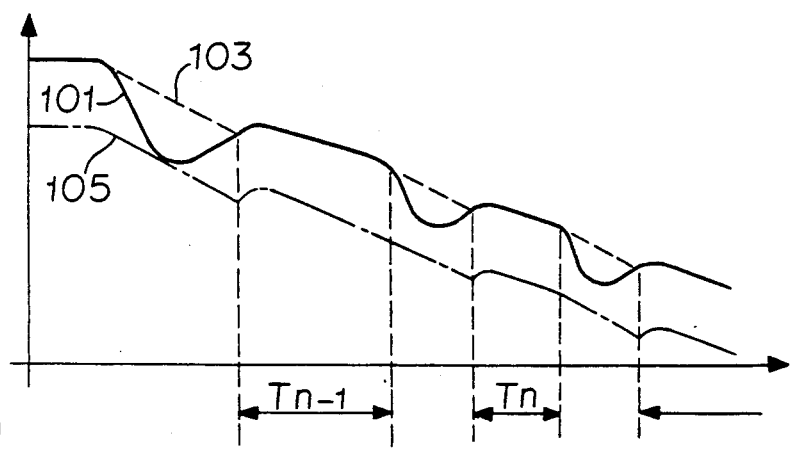
FIGURE 4(b)
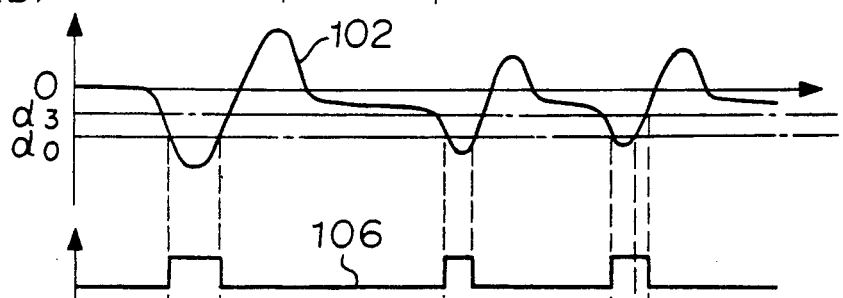
FIGURE 4(c)
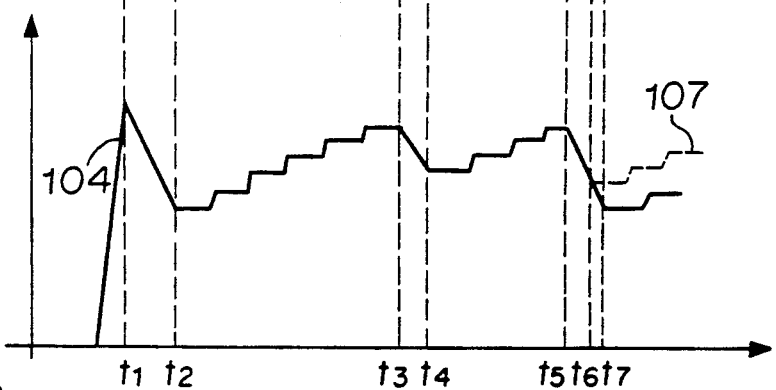
FIGURE 4(d)

ANTISKID BRAKE CONTROL SYSTEM

BACKGROUND OF THE INVENTION

1. Field of the Invention

The present invention relates to an antiskid brake control system wherein when there is a tendency of a vehicle wheel to lock at the time of braking the vehicle, a brake pressure adjusting device is utilized to decrease a brake pressure, wherein when the revolution of the wheel has been restored due to such pressure reduction, the brake pressure is revived, and wherein these operations are repeated to prevent the wheel from coming into its lock state.

2. Discussion of Background

FIG. 5 is a drawing to help explain the operation of a conventional antiskid brake control system as disclosed in e.g. Japanese Examined Patent Publication No. 21859/1986. Referring to FIG. 5, the conventional antiskid brake control system detects the speed 101 of a vehicle wheel. The system decreases a brake pressure 104 if the deceleration 102 of the wheel has achieved given deceleration reference value $\alpha_0$ or more, or if the slip ratio found based on the wheel speed 101 and vehicle speed 103 has achieved given slip ratio reference value $S_0$ or more.

The conventional system holds the brake pressure 104 constant if the wheel deceleration 102 has achieved not greater than the deceleration reference value $\alpha_0$, or if the wheel acceleration 102 has achieved a first acceleration reference value $\alpha_1$ or more provided that the wheel slip ratio has achieved not smaller than the reference value $S_0$. The system gradually increases the brake pressure if the wheel acceleration 102 has achieved value smaller than the first acceleration reference value $\alpha_1$.

The system rapidly increases the brake pressure 104 if the wheel acceleration 102 has achieved a second acceleration reference value $\alpha_2$ or above which is greater than the first acceleration reference value $\alpha_1$.

In e.g. the cases wherein the road on which the vehicle is driving is significantly slippery, or the vehicle has driven from a dry road onto an iced surface, the conventional antiskid brake control system cannot prevent a tendency of a vehicle wheel to lock, or sufficiently revive the locked wheel even though the brake pressure is extremely low.

As explained, an adequate pressure varies from the conditions of road surface to the conditions of road surface. It is extremely difficult to obtain an adequate pressure-decreasing amount without considering the relationship between the conditions of road surface and the brake pressure.

SUMMARY OF THE INVENTION

It is an object of the present invention to dissolve these problems, and to provide a new and improved antiskid brake control system capable of obtaining an adequate pressure-decreasing amount based on the relationship with the conditions of road surface and a brake pressure.

The foregoing and other objects of the present invention have been attained by providing an antiskid brake control system comprising braking force adjusting means for decreasing and increasing a brake pressure to be applied to at least one wheel to prevent the wheel from coming into a lock state at the time of braking, thereby allowing the vehicle with the braked wheel to be stably stopped; wheel speed detecting means for detecting the speed of the wheel; wheel deceleration calculation means for calculating deceleration of the wheel; vehicle speed calculation means for calculating vehicle speed based on the wheel speed; slip ratio calculation means for calculating slip ratio based on the vehicle speed and the wheel speed; pressure-decreasing and pressure-increasing amount calculation means for calculating a required increase and decrease in the brake pressure based on the wheel deceleration and the slip ratio, and for outputting a signal required to drive the braking force adjusting means; non-slip period detecting means for detecting the non-slip period wherein the slip ratio is substantially zero; and decreasing amount adjusting means for outputting a signal indicative of an increase in the brake pressure reduction to the pressure-decreasing and pressure-increasing amount calculation means when the non-slip period is not longer than given value.

In accordance with the present invention, the relationship between the brake and the road surface on which the vehicle is driving is extrapolated depending on the length of the non-slip period, and the pressure-decreasing amount is modified based on the extrapolation. As a result, the brake pressure can be optimized to be suited for the conditions of the road surface, thereby preventing the wheel of the vehicle from coming into a lock state.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram showing an embodiment of the antiskid brake control system according to the present invention;

FIGS. 4(a), 4(b), 4(c), and 4(d) are graphs showing an operation according to the present invention.

DETAILED DESCRIPTION OF THE PREFERRED EMBODIMENTS

Figure 2A:
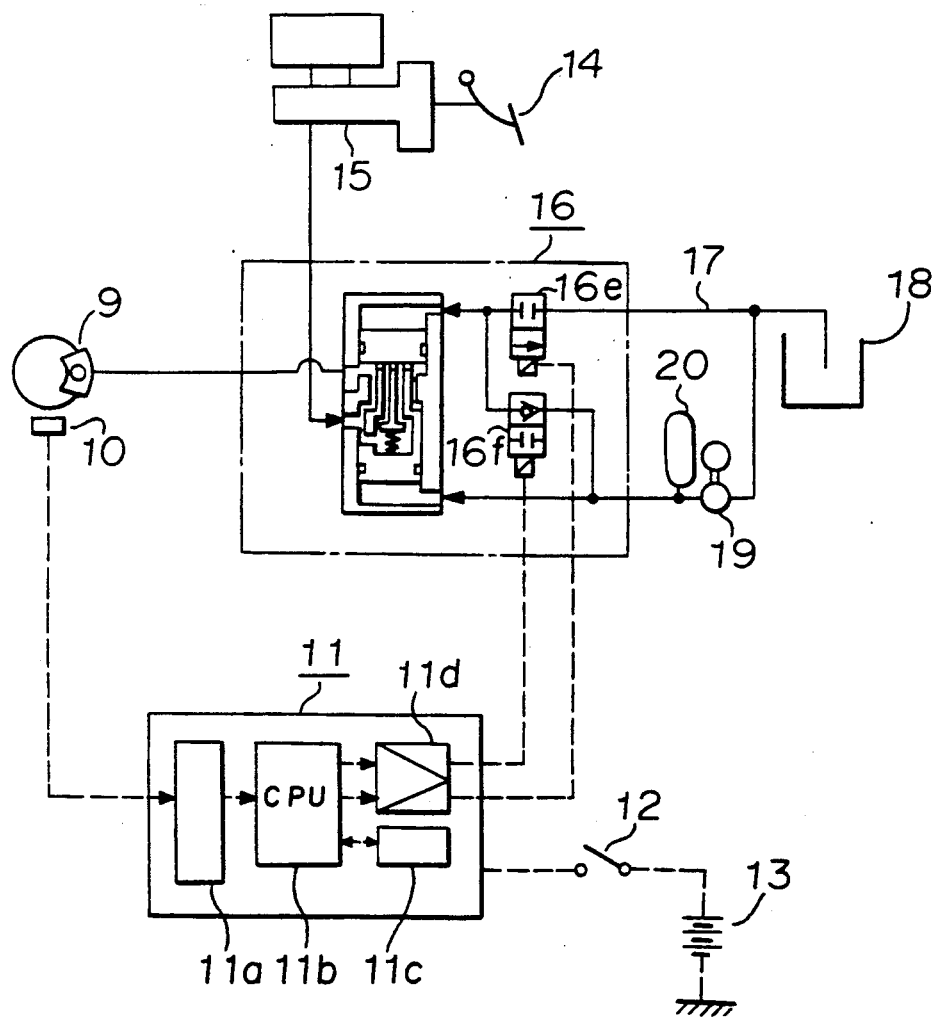
FIG. 2(a) is a block diagram showing a specific structure of the embodiment.

Now, the present invention will be described in detail with reference to a preferred embodiment illustrated in the accompanying drawings.

FIG. 1 is a block diagram showing the schematic structure of the embodiment.

In accordance with the embodiment shown in FIG. 1, the antiskid brake control system is constituted by vehicle wheel speed detecting means 1, vehicle wheel deceleration calculation means 2, vehicle speed calculation means 3, slip ratio calculation means 4, non-slip period detecting means 5, pressure-decreasing amount adjusting means 6, pressure-decreasing amount and pressure-increasing amount calculation means 7, and brake pressure adjusting means 8.

The vehicle wheel speed detecting means 1 is to detect the speed of at least one wheel of the vehicle with which the antiskid brake control system is equipped. The wheel deceleration calculation means 2 calculates wheel deceleration based on the wheel speed detected by the wheel speed detecting means 1, and outputs the results of the calculation to the pressure-decreasing amount and pressure-increasing amount calculation means 7.

The vehicle speed calculation means 3 is to calculate the speed of the vehicle based on the wheel speed, and outputs the results of the calculation to the slip ratio calculation means 4.

The slip ratio calculation means 4 is to calculate slip ratio based on the vehicle speed and the wheel speed, and outputs the calculated slip ratio to the pressure-decreasing amount and pressure-increasing amount calculation means 7 and the non-slip period detecting means 5.

The non-slip period detecting means 5 is to carry out detection on the period wherein the slip ratio is substantially 0. Based on the detection on the non-slip ratio, the pressure-decreasing amount adjusting means 6 is to give to the pressure-decreasing amount and pressure-increasing amount calculation means 7 such output that the decreasing amount can be adjusted to optimize the brake pressure.

The pressure-decreasing amount and pressure-increasing amount calculation means 7 is to calculate a required decreasing amount and increasing amount based on the wheel deceleration, the slip ratio and the output from the pressure-decreasing amount adjusting means 6, and to output signals indicative of pressure-decrease and pressure-increase to the brake pressure adjusting means 8.

The pressure-decreasing and pressure-increasing signals cause the brake pressure adjusting means 8 to be operated, thereby to decrease and increase the brake pressure in a suitable manner.

Next, the embodiment will be explained in more detail with reference to FIG. 2.

FIG. 2(a) is a block diagram showing a schematic structure of the specific embodiment. Explanation on only one wheel will be made for the sake of simplicity.

In FIG. 2(a), reference numeral 9 designates a wheel brake. Reference numeral 10 designates a wheel speed sensor which is arranged to detect the speed of the wheel to be braked.

Reference numeral 11 designates a control circuit which is provided with power by a vehicle battery 13 through a power source switch 12. The control circuit 11 receives at its input circuit 11a a signal from the wheel speed sensor 10. The control circuit 11 includes a CPU 11b using a microcomputer. The CPU 11b operates in accordance with an instruction program stored in a memory 11c of the control circuit. The CPU 11b outputs the results of the operation through its output circuit 11d. The braking force is transmitted to the wheel brake 9 through a master cylinder 15 and through a brake pressure adjusting actuator 16 when a driver presses a brake pedal 14 under normal conditions.

The operation which is made under antiskid conditions will be described in detail with reference to FIG. 2(b) which is an enlarged view of the braking force adjusting actuator 16.

Figure 2B:
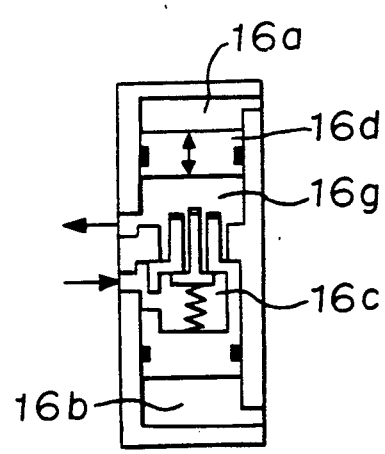
FIG. 2(b) is an enlarged sectional view of the braking force adjusting actuator shown in FIG. 2(a)

In FIG. 2(b), the pressure in a chamber 16a and the pressure in a chamber 16b of the actuator 16 are kept at the same level under normal conditions, and a cut valve 16c of the actuator is therefore pushed by a piston 16d of the actuator to be opened.

When a signal indicative of a decrease in the brake pressure is outputted from the control circuit 11, a solenoid valve 16e for pressure-decreasing operation and a solenoid valve 16f for pressure-holding operation are both operated to release the pressure in the chamber 16a to a reservoir 18 through a conduit 17.

As a result, the piston 16d is shifted upward in FIG. 2(b) to close the cut valve 16c, causing the communication between the master pressure and the wheel pressure to be cut off, and the volume in the chamber 16g to expand. Thus, the braking force is decreased.

When the control circuit 11 outputs a signal indicative of holding the pressure, the solenoid valve 16e for pressure-decreasing operation is made inoperative while only the solenoid valve 16f for pressure-holding operation is operated. As a result, the movement of the piston 16d is stopped to hold the braking force.

When the control circuit 11 outputs a signal indicative of an increase in the brake pressure, both the solenoid valve 16e and the solenoid valve 16f are made inoperative, causing a pressure to enter the chamber 16a by the combination of a pump motor 19 and accumulator 20 as power source, the pump motor and the accumulator maintaining a high pressure. Thus, the piston 16d is shifted downward in FIG. 2(b) to decrease the volume in the chamber 16g, causing the braking force to be increased.

As explained, the system according to the present invention has such function that the operations of decreasing the brake pressure, holding the brake pressure and increasing the brake pressure are repeated in accordance with commands from the control circuit 11 to adjust the braking force, thereby preventing the wheel to be locked.

Figure 3:
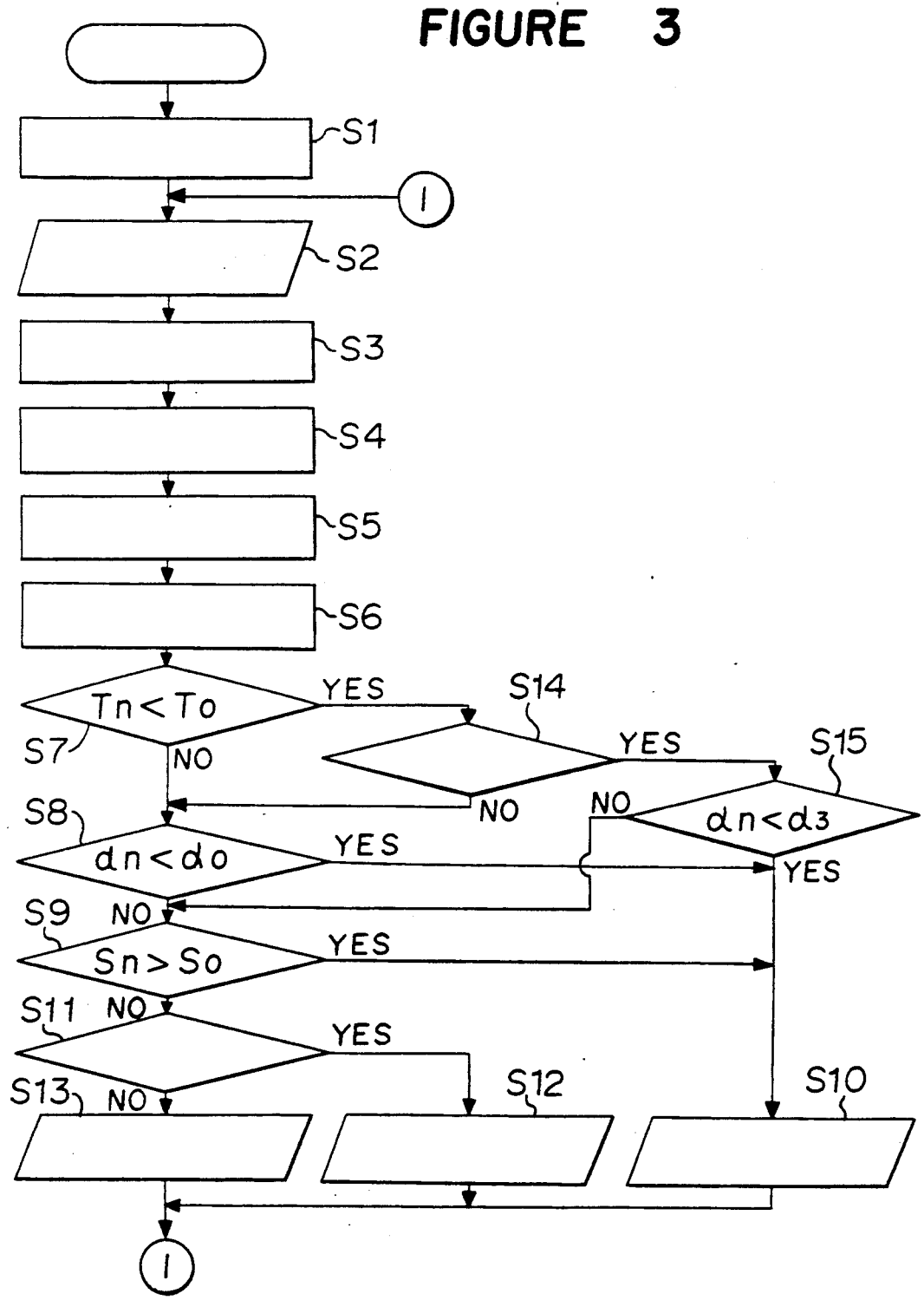
FIG. 3 is a flow chart showing the operation of a microcomputer incorporated in the control circuit shown in FIG. 2(a)
Figure 5:
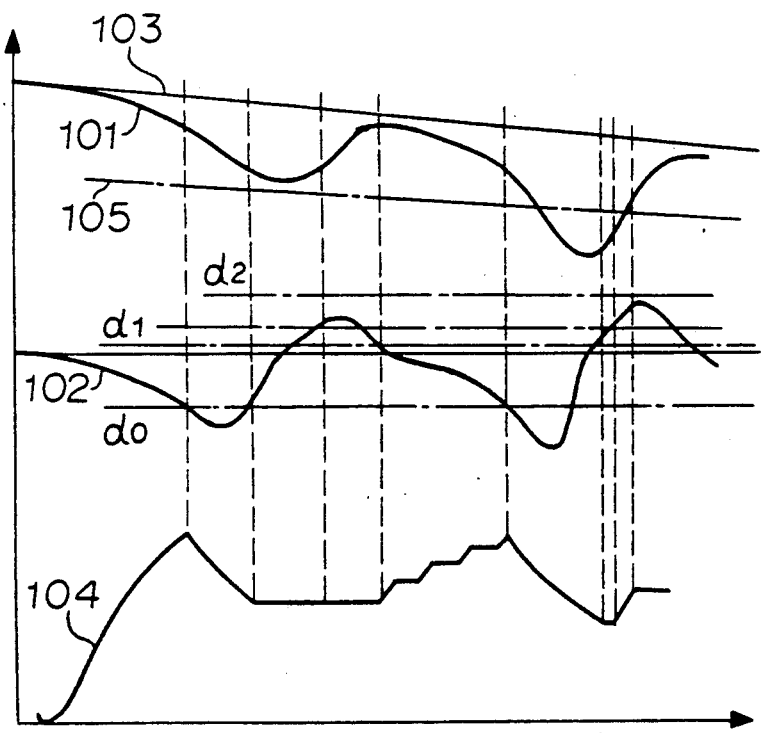
FIG. 5 is a drawing of graphs showing a conventional antiskid brake control system.

Next, the operation of the microcomputer in the control circuit 11 will be explained with reference to the flow chart of FIG. 3.

When the operation of the microcomputer starts, RAMs, outputs and others are initialized at a step S1 and the wheel speed $V_n$ is calculated at a step S2. As the calculation manner to find the wheel speed $V_n$, e.g. a periodic measurement can be applied. In the periodic measurement, the wheel speed $V_n$ is found based on the number $P_n$ of the pulses corresponding to the wheel speed which have been inputted through the input circuit 11a of FIG. 2(a) in a certain period, the time $t_{p1}$ when the first pulse is inputted after the measurement started, and the time $t_{pn}$ when the final pulse is inputted, in accordance with the following expression wherein K is a constant:

$$V_n = K \frac{P_n - 1}{t_{pn} - t_{pl}}$$

At the next step S3, the wheel deceleration $\alpha_n$ is calculated. As the calculation of the wheel deceleration, the wheel deceleration is found based on the control cycle T of the microcomputer, the wheel speed $V_{n-1}$ in the preceding control cycle, and the wheel speed $V_n$ in the present control cycle, in accordance with the following expression:

$$\alpha_n = L \frac{V_n - V_{n-1}}{T}$$

In the expression, the inequality, $a_n<0$, means deceleration, the inequality, $a_n>0$, means acceleration, and L is a constant.

At the next step S4, the vehicle speed $V_{pn}$ is calculated. As the calculation of the vehicle speed, the value which is obtained by descending the vehicle speed $V_{pn-1}$ in the preceding control cycle at a predetermined gradient, and the value of the wheel speed $V_n$ is compared, and a greater value is chosen to find the vehicle speed.

At the next step S5, the slip ratio $S_n$ is calculated. The following expression is used to carry out the calculation of the slip ratio:

$$S_n = \frac{V_{pn} - V_n}{V_{pn}}$$

At the next step S6, the non-slip period $T_n$ wherein the slip ratio $S_n$ is substantially 0 is measured.

At the next step S7, it is judged whether the non-slip period $T_n$ is shorter than a given value $T_0$ or not. If negative, at steps S8, S9 and S10, a signal indicative of a decrease in the brake pressure is outputted when the vehicle deceleration $a_n$ exceeds the given wheel deceleration reference value $a_0$ or when the slip ratio $S_n$ exceeds the given slip ratio reference value $S_0$, as usual. If pressure-increasing conditions are established at a step S11 provided that the wheel deceleration is not higher than the wheel deceleration reference value $a_0$ and that the slip ratio is not higher than the slip ration reference value $S_0$, a signal indicative of an increase in the brake pressure is outputted at a step S12. If negative, a signal indicative of holding the brake pressure is outputted at a step S13.

On the other hand, if the non-slip period $T_n$ is shorter than the given value $T_0$ at the step S7, it is judged at the next step S14 whether the brake pressure was decreased based on the conditions of the wheel deceleration in the preceding control cycle or not. If affirmative, a signal indicative of a decrease in the brake pressure at a step S10 provided that at a step S15 the wheel deceleration $a_n$ is greater than wheel deceleration $a_3$ which is smaller than the given wheel deceleration reference value $a_0$.

It means that if the non-slip period $T_n$ is shorter than the given value $T_0$, the wheel deceleration reference value which is used in the vicinity of the completion of the pressure-decreasing operation is changed to the smaller value $a_3$ to lengthen the pressure-decreasing period, thereby allowing the pressure-decreasing amount to be increased.

Now, the case wherein the operations mentioned above are carried out at a vehicle will be explained with reference to FIG. 4.

Suppose that the wheel speed has changed as indicated by 101 in FIG. 4(a). The wheel deceleration is calculated as indicated by 102 in FIG. 4(b). The vehicle speed is calculated as indicated in dotted line 103 in FIG. 4(a). The vehicle speed with slip ratio of $S_0$% is calculated as indicated by 105 in FIG. 4(a).

Based on the wheel deceleration, a signal indicative of a decrease in the brake pressure is outputted as indicated by 106 in FIG. 4(c), and the brake pressure is therefore changed as indicated by 104 in FIG. 4(d).

If the wheel deceleration is greater than the wheel deceleration reference value $a_0$, the pressure-decreasing operation is carried out at the time periods of t1→t2, t3→t4 and t5→t6, causing the brake pressure to be changed as indicated by dotted line in FIG. 4(d). If, the non-slip period $T_n$ is shorter than the given value $T_0$, the wheel deceleration reference value $a_0$ which is utilized in the vicinity of the completion of the pressure-decreasing operation is changed to $a_1$ to carry out the pressure-decreasing operation at the time period from t5 to t7, allowing the brake pressure to be controlled at the optimum manner wherein the brake pressure is lower than that indicated by 107 in FIG. 4(d).

Although in the case wherein the non-slip period is shorter than the given value, the embodiment as stated earlier lessens only the wheel deceleration reference value which is utilized in the vicinity of the completion of the pressure-decreasing operation, the wheel deceleration reference value which is utilized in the vicinity of the commencement of the pressure-decreasing operation can be lessened, or each reference value can be lessened, offering similar advantage.

Similar advantage can be obtained by lessening the slip ratio reference value or lengthening the pressure-decreasing period for a certain period.

Obviously, numerous modifications and variations of the present invention are possible in light of the above teachings. It is therefore to be understood that within the scope of the appended claims, the invention may be practiced otherwise than as specifically described herein.

What is claimed is:

1. An antiskid brake control system comprising:
   braking force adjusting means responsive to a pressure signal for decreasing and increasing a brake pressure to be applied to at least one wheel of a vehicle to prevent the wheel from locking at the time of braking, thereby allowing the vehicle to stably stop;
   wheel speed detecting means for detecting the speed of the wheel and outputting a wheel speed signal indicative of said wheel speed;
   wheel deceleration calculation means responsive to said wheel speed signal for calculating a deceleration of the wheel and outputting a signal indicative of said wheel speed deceleration;
   vehicle speed calculation means responsive to said wheel speed signal for calculating a vehicle speed based on the wheel speed and outputting a vehicle speed signal indicative of said vehicle speed;
   slip ratio calculation means responsive to said vehicle speed signal and said wheel speed signal for calculating a slip ratio of the wheel based on the vehicle speed and the wheel speed and outputting a slip ratio signal;
   pressure-decreasing and pressure-increasing amount calculation means responsive to said wheel deceleration signal, said slip ratio signal, and a pressure decreasing amount signal for calculating a required increase and decrease in the brake pressure based on the wheel deceleration and the slip ratio, and for outputting said pressure signal required to drive the braking force adjusting means;
   non-slip period detecting means responsive to said slip ratio signal for detecting a non-slip period wherein the slip ratio is substantially zero and outputting a non-slip signal; and
   decreasing amount adjusting means responsive to said non-slip signal for outputting said pressure decreasing amount signal indicative of an increase in the brake pressure reduction to the pressure-decreasing and pressure-increasing amount calculation means when the non-slip period is less than a predetermined value.

2. The antiskid brake control system as claimed in claim 1, further comprising: an input receiving means for receiving said wheel speed signal; a computer means having a memory means responsive to said wheel speed signal for calculating said deceleration of said vehicle wheel, said vehicle speed, and said slip ratio for computing said pressure signal representative of whether to increase, hold, or decrease said braking force; and an output means for outputting said pressure signal to said brake force adjusting means.

* * * * *